United States Patent [19]

Fong

[11] Patent Number: 5,067,673
[45] Date of Patent: Nov. 26, 1991

[54] ESSENTIALLY PASSIVE METHOD FOR INVERTING THE ORIENTATION OF A DUAL SPIN SPACECRAFT

[75] Inventor: Herbert S. Fong, Rancho Palos Verdes, Calif.

[73] Assignee: Hughes Aircraft Company, Los Angeles, Calif.

[21] Appl. No.: 477,274

[22] Filed: Feb. 7, 1990

[51] Int. Cl.$^5$ .......................... B64G 1/28; B64G 1/24
[52] U.S. Cl. .................................. 244/165; 244/164; 244/171
[58] Field of Search ................ 244/164, 165, 170, 171

[56] References Cited

U.S. PATENT DOCUMENTS

| | | | |
|---|---|---|---|
| 3,811,641 | 5/1974 | Hopper | 244/165 |
| 4,275,861 | 6/1981 | Hubert | 244/170 |
| 4,306,692 | 12/1981 | Kaplan et al. | 244/165 |
| 4,927,101 | 5/1990 | Blancke | 244/170 |

OTHER PUBLICATIONS

Kaplan, "Modern Spacecraft Dynamics and Control", John Wiley and Sons, 1976 pp. VII, 147, 148, 149, 367, 368, 369.

Primary Examiner—Joseph F. Peters, Jr.
Assistant Examiner—Anne E. Bidwell
Attorney, Agent, or Firm—Robert A. Westerlund; Steven M. Mitchell; Wanda K. Denson-Low

[57] ABSTRACT

An essentially passive and "fuel-less" method for inverting the orientation of a preferably nutationally stable, dual spin spacecraft disposed in an inclined orbit, includes the steps of increasing the rotational speed of (i.e., "spinning up") the spacecraft's despun platform and decreasing the rotational speed of (i.e., "spinning down") the spacecraft's rotor, to thereby generate, via product of inertia coupling, a transverse torque of sufficient magnitude to temporarily destabilize the spacecraft and cause the spacecraft spin axis, which is the minimum moment of inertia axis of the spacecraft, to diverge and precess through a flat spin orientation and towards a final, inverted orientation, e.g., disposed at a precession angle of 180° relative to the initial orientation of the spacecraft spin axis. Normally, prior to the spacecraft spin axis reaching the final, inverted orientation, the spin axis encounters and is "stuck at" a barrier nutation angle beyond which further precession of the spacecraft spin axis is not possible without the implementation of a final acquisition procedure, which includes the steps of detecting the occurrence of the spin axis reaching the barrier nutation angle, and in response thereto, instituting limit cycle rotational motion of the platform, to thereby render non-secular the rotational motion of the platform, whereby the spacecraft damping system is brought into its pull-in or effective operating range for penetrating the barrier nutation angle, in order to achieve acquisition of the final inverted orientation of the spacecraft spin axis. Limit cycle rotation of the platform is preferably effectuated by way of applying a first and a second series of torquing pulses to the spacecraft despin motor suitable for reducing the rotational speed of the platform, the first series of pulses being of larger magnitude than that of the second series of pulses.

13 Claims, 1 Drawing Sheet

ESSENTIALLY PASSIVE METHOD FOR INVERTING THE ORIENTATION OF A DUAL SPIN SPACECRAFT

This invention was made with Government support. The Government has certain rights in this invention.

FIELD OF THE INVENTION

The present invention relates generally to the spacecraft field, and more particularly, to a passive method for inverting the orientation of a dual spin spacecraft, e.g., a dual spin satellite.

BACKGROUND OF THE INVENTION

The principles of design, construction, and operation of dual spin satellites is well-known in the art. Generally speaking, dual spin satellites are spacecrafts which are generally comprised of a gyroscopic spinning body, oftentimes referred to as a rotor, rotatably coupled by a despin motor and bearing assembly to a relatively stationary body, oftentimes referred to as a despun platform. Although the platform is referred to as despun, it may be rotating with respect to the rotor. The despun platform carries the payload, e.g., scientific instruments, communications equipment, surveillance equipment, antenna(s), or the like. Oftentimes, the spin axis of the spacecraft is the principal axis of minimum moment of inertia, which is inherently unstable. Consequently, internal energy dissipation, e.g., due to structural flexing, fuel depletion, fuel sloshing, etc., will cause nutation of the satellite, which is a coning motion of the bearing or spin axis about the total angular momentum vector, which is fixed in inertial space in accordance with the law of conservation of angular momentum, in the absence of externally-applied torques, e.g., due to solar radiation pressure and/or gravitational field gradients. However, it should be understood that nutation caused by internal torquing between various components of the spacecraft can result in an exchange of momentum therebetween, without changing the total angular momentum vector of the spacecraft. If not checked, the nutational motion becomes a tumbling motion.

Accordingly, active or passive nutational damping means must be provided to damp out nutation of the spacecraft about its spin axis. A platform-mounted passive nutation damping device is disclosed in U.S. Pat. No. 3,442,468, issued to Iorillo, whose teachings are herein incorporated by reference. A motor active nutation damping system is disclosed in U.S. Pat. No. 4,096,427, issued to Rosen et al., whose teachings are herein incorporated by reference. In the latter damping system, a closed loop servo feedback control system is utilized to apply corrective torques by means of controlling the speed of the despin motor, in order to maintain the desired spin axis orientation.

Additionally, in order to provide for spacecraft attitude control and stationkeeping, the rotor is generally provided with axial and radial jets and/or thrusters which are controllably fired in order to precess the spin axis in response to both instantaneous and gradual changes of the orbital inclination of the spin axis, e.g., due to solar pressure, gravitational anomalies, e.g., solar and lunar gravitational perturbations, and other external torques acting in both the latitudinal and longitudinal direction of motion of the spacecraft as it orbits the earth. The various types of spacecraft stationkeeping and attitude control systems need not be mentioned here, since they are so well-known in the art. Of course, the firing of the jets and/or thrusters necessitates the expenditure of fuel or propellant which is normally stored in vessels or tanks housed by the rotor.

It is also well-known that dual spin satellites which are fixed in a highly inclined earth orbit must be inverted on a regular, periodic basis, e.g., semi-annually, in order to avoid thermal overloading of the payload and other on-board hardware, and system components. More particularly, when the sun angle geometry becomes thermally adverse, the rotor-mounted jets are controllably fired to precess the spin axis by a total of 180°, to thereby invert the orientation of the dual spin satellite so as to prevent direct exposure to the sun. This is the predominant, presently available technique for accomplishing this spacecraft orientation inversion maneuver.

As will be readily appreciated by those skilled in the pertinent art, it would be highly advantageous to have available an essentially passive method of accomplishing this spacecraft orientation inversion maneuver, which does not require the expenditure of fuel, instead of the presently available method described above, for at least the following several reasons. First of all, the useful life of the spacecraft can be significantly extended, since the amount of fuel required for these inversion maneuvers is typically ⅓ or so of the total fuel supply of a dual spin spacecraft fixed in a highly-inclined orbit. Thus, the conserved fuel can be used for other purposes, such as stationkeeping and attitude control, which control is usually necessary to maintain useful or optimum operation of the dual-spin spacecraft for its intended mission. Secondly, all or a portion of the spacecraft launch weight normally allocated to the propellant budget for inversion maneuvers can be used instead to increase the useful payload weight. Thirdly, all or a portion of the launch costs attributable to the weight of the propellant normally utilized for inversion maneuvers can be saved. This cost savings can be quite significant since the launch cost per pound is very high, e.g., on the order of $20,000 per pound. It is believed that the overall cost savings attributable to conserved fuel is on the order of $2-$4 million. Fourthly, a passive inversion technique can be utilized to invert the orientation of satellites which have already been deployed (i.e., which are already in orbit), even satellites which are low on or out of fuel and thus, heretofore believed to be at or near the end of their useful lives, since without fuel, they can not have their orientation inverted, thereby resulting in destructive thermal overloading of the payload carried by and/or system components of the satellite. Fifthly, with a passive inversion technique, there will not be perturbations to the spacecraft orbit and/or attitude due to firing of jets, as are occasioned by the presently available inversion technique. These perturbations, if not eliminated, can disrupt or interrupt the continuity of operation of the satellite for its intended purpose, as well as require consumption of yet additional fuel for corrective attitude control maneuvers necessitated by these perturbations.

The present invention constitutes such a highly advantageous, essentially passive method for inverting the orientation of a dual spin spacecraft disposed in a highly-inclined orbit.

SUMMARY OF THE INVENTION

The present invention encompasses an essentially passive method for inverting the orientation of a preferably nutationally stable dual spin spacecraft disposed in an inclined earth orbit, and spinning about its minimum moment of inertia axis, including the steps of accelerating the rotation of the despun platform and decelerating the rotation of the rotor of the dual spin spacecraft, to thereby generate, through product of inertia coupling, a transverse torque perpendicular to the spacecraft spin axis, the transverse torque being of sufficient magnitude to temporarily destabilize the spacecraft and cause the spin axis to diverge and precess through a flat spin orientation and towards a final, inverted orientation, e.g., disposed at a 180° precession angle relative to the initial orientation of the spacecraft spin axis. Normally, prior to the spacecraft spin axis reaching the final, inverted orientation, the spin axis encounters and is "stuck at" a barrier nutation angle beyond which further precession of the spacecraft spin axis is not possible without the implementation of a final acquisition procedure, which includes the steps of detecting the occurrence of the spacecraft spin axis reaching the barrier nutation angle, and in response thereto, instituting limit cycle (i.e., bi-directional) rotational motion of the platform, thereby rendering non-secular the rotational motion of the platform whereby the spacecraft passive nutation damping system is enabled (i.e., becomes effective) for reducing the barrier nutation angle in order to achieve acquisition of the final, inverted orientation of the spacecraft spin axis. Limit cycle rotation of the platform is preferably instituted by means of applying a first and a second series of torquing pulses to the spacecraft despin motor suitable for reducing the rotational speed of the platform, the first series of pulses being of substantially larger magnitude than that of the second series of pulses.

Other aspects and features of the present invention will become apparent from the following detailed description of the invention, taken in conjunction with the accompanying drawings, in which:

DETAILED DESCRIPTION OF THE PRESENT INVENTION

Figure 1B:
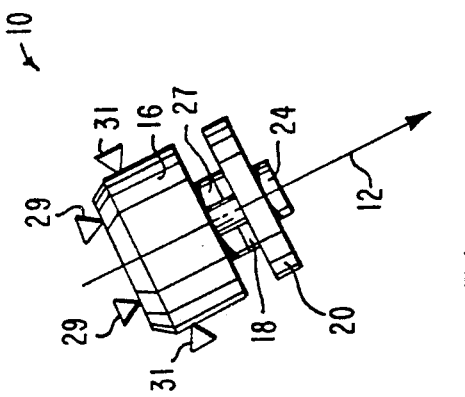
FIGS. 1a-d schematically illustrate successive positions of a dual spin satellite as it undergoes an orientation inversion maneuver in accordance with the method of the present invention.

Referring now to FIGS. 1a-d, there can be seen a schematic view of a dual spin satellite 10 disposed in an inclined earth orbit, wherein the spin axis 12 of the satellite 10 is disposed at an angle theta with respect to the inertially fixed axis 14. The dual spin satellite 10 may be of any convenient design and construction well-known in the prior art, e.g., the type manufactured by Hughes Aircraft Company and known as the "Hughes Gyrostat System," various embodiments of which are disclosed in U.S. Pat. Nos. 3,442,468 issued to Iorillo; 3,877,316, issued to Reiter et al.; 3,877,662, issued to Reiter et al.; 3,806,062, issued to Hoffman et al.; 4,437,047, issued to Smay; and 4,096,427, issued to Rosen et al., all of whose teachings are herein incorporated by reference. A brief description of particularly salient aspects and features of the Hughes Gyrostat System can be found in an article entitled "Hughes Gyrostat System," Hughesnews, Nov. 3, 1967, which is also herein incorporated by reference.

In general, the dual spin satellite 10 is comprised of a gyroscopic spinning body or rotor 16 (sometimes also referred to as the spinner) rotatably coupled via a despin motor and bearing assembly 18 to a relatively stationary body or despun platform 20 which can be rotated relative to the rotor 16 at any selected rate of rotation with respect to earth-centered space, including zero r.p.m. The spin axis 12 is defined as the z-axis of an x,y,z internal coordinate system of the satellite 10, with the z-axis being the principal axis of minimum moment of inertia of the spacecraft 10. The center of gravity or mass of the entire dual spin satellite 10 is indicated by the point designated C.M. The principal axis of maximum moment of inertia of the satellite 10 is defined to be transverse or perpendicular to the z-axis, i.e., in the x-y plane. The total angular momentum vector H of the satellite 10 is fixed in inertial space in accordance with the law of conservation of angular momentum, in the absence of external torques. Nutational stability of the satellite 10 about its spin axis 12 is achieved by means of a passive nutation damper or damping system 24 mounted on the despun platform 20. The passive nutation damper 24 may be of any convenient type well-known in the art, e.g., the type disclosed in previously-referenced U.S. Pat. No. 3,442,468, issued to Iorillo, for dissipating any nutational motion formed by the spin axis 12 and the angular momentum vector H. In general, the nutation damper 24 serves to dissipate kinetic energy generated within the satellite 10 tending to cause instability, e.g., due to structural flexing, fuel depletion, fuel sloshing/dedamping, or the like. Additionally, a motor active nutation damping system 27 is preferably further provided to damp nutation which exceeds the operating range or limits of the passive nutation damping system 24, i.e., when the passive nutation damping system 24 becomes saturated. Any convenient type of motor active nutation damping system may be utilized, e.g., the type disclosed in previously-referenced U.S. Pat. No. 4,096,427, issued to Rosen et al. Since the details of design, construction, and operation of such a system are well-known in the pertinent art, they will not be described herein. In general though, the motor active damping system 27 includes facilities (not shown) for generating error signals indicative of the nutation angle of the satellite 10, and a controller (not shown), e.g., an on-board microprocessor or computer (suitably programmed), responsive to these error signals for generating appropriate motor control signals which are applied to the despin motor 18 in order to generate appropriately phased transverse reaction torques to offset or counteract the disturbing torques (e.g., due to fuel dedamping) which instigate the nutation of the satellite 10 about its spin axis 12.

Figure 1A:
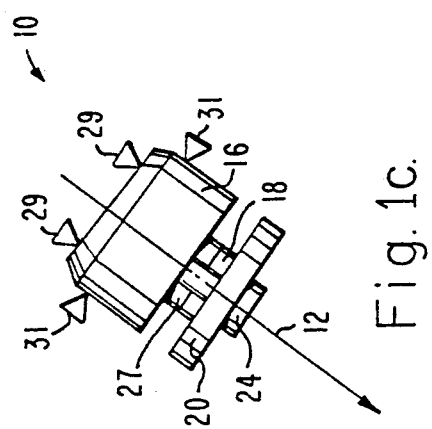
Figure 1C:
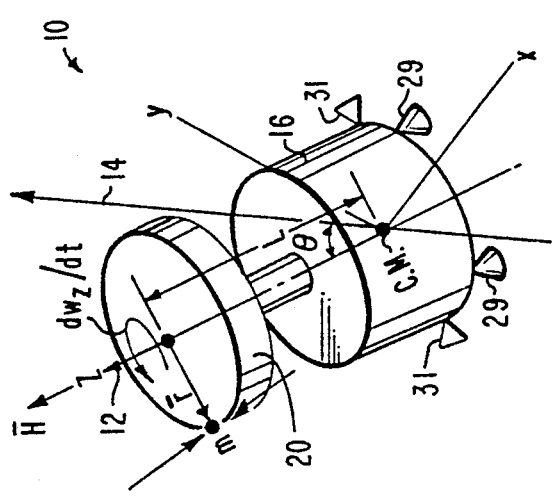

With continuing reference to FIG. 1a, it can be seen that the rotor 16 is further provided with axial and radial jets 29, 31, respectively, which suitably function in the conventional manner to precess the spin axis 12 in response to both instantaneous and gradual changes of the orbital inclination of the spin axis 12, e.g., due to solar radiation pressure, gravitational anomalies, and other externally-generated torques acting in both the latitudinal and longitudinal direction of motion of the satellite 10 as it orbits the earth. In general, the axial and radial jets 29, 31 are controllably fired, e.g., under the supervision of an on-board microprocessor or computer controller (not shown), or via ground control in order to provide for spacecraft attitude control and stationkeeping. Since the details of design, construction, and operation of such a spacecraft attitude control and stationkeeping system are well-known in the pertinent art, they will not be described herein. Of course, the firing of the jets, 29, 31 consumes fuel or propellant, which is normally stored in vessels (not shown) housed by the rotor 16.

Although not illustrated in the accompanying drawings, it is well-known in the pertinent art that the despun platform 20 is configured to carry a payload (not shown), e.g., scientific observation and information-gathering instruments, communications equipment, surveillance equipment, antenna(s), or the like. Further, it is also well-known that the rotor 16 is normally adapted to carry the spacecraft electrical power system (not shown), including solar panels (not shown) circumferentially mounted thereto. It is also well-known that with a satellite disposed in an inclined orbit (e.g., 200 miles or so above the earth's surface), it is normally necessary to periodically invert the orientation of the satellite in order to prevent thermal overloading of the payload, the solar panels, the fuel tanks, the on-board hardware (e.g., on-board control electronics), and other system components due to prolonged, direct exposure to the sun. In this regard, the satellite 10 is preferably equipped with facilities (not shown) for monitoring the sun angle which is defined as the angle between the satellite spin axis 12 and the sun. When the sun angle exceeds a prescribed threshold, a torque transverse or perpendicular to the spin axis 12 must be generated in order to precess the spin axis 12 through 180° in order to thereby invert the orientation of the satellite 10. Heretofore, it has been conventional practice to fire the jets 29, 31 in order to perform this inversion maneuver, which is generally performed on a semi-annual basis, due to seasonal changes of the sun angle. As previously discussed in a foregoing portion of this document, it would be highly advantageous to have a method for performing this spacecraft inversion maneuver without necessitating consumption of fuel, i.e., without necessitating the firing of the jets 29, 31.

Figure 1D:
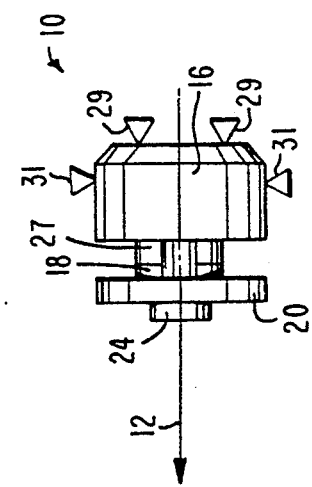

In accordance with the present invention, an essentially passive method for inverting the orientation of a dual spin satellite is provided. FIGS. 1a–d schematically depict successive positions of the dual spin satellite 10 as it undergoes an orientation inversion in accordance with this essentially passive method of the present invention. In FIG. 1a, the dual spin satellite 10 is in its normal operating orientation, i.e., in an inclined orbit. In order to complete an orientation inversion maneuver for the purpose of minimizing the sun angle, it is necessary to precess the spin axis 12 through 180°, from this initial position to a final position in which the spacecraft 10 is oriented upside-down, as is depicted in FIG. 1d. The essentially passive spacecraft orientation inversion method of the instant invention is practiced without the need to fire the jets 29, 31. Rather, the inversion maneuver is preferably completely executed by only utilizing the despin motor 18, in a manner to be fully described in the ensuing discussion. Prior to actually initiating the spacecraft inversion maneuver, however, it is necessary to determine whether the satellite 10 is nutationally stable at that particular point in time, which is primarily dependent upon the amount of propellant remaining in the rotor-mounted fuel tanks (not shown) and the mass distribution of the satellite 10 at that time. The most reliable way to ascertain whether or not a nutationally stable condition exists, is to perform an on-orbit test. In accordance with another novel aspect of the instant invention, such a test can be conducted by inducing a nutation angle, and observing via telemetry whether the nutation angle is decreasing with time, which is the case if the satellite 10 is in a nutationally stable condition. The nutation angle can be induced without firing jets by commanding a motor torque pulse train (not shown) to the despin motor 18 in phase with the nutation frequency. Each application of a torque pulse will ideally be in phase with the nutation frequency and increase the nutation angle by producing an effective transverse torque through product of inertia coupling. A nutation angle of approximately 2–10 degrees has typically been found to be effective for this test. If the satellite 10 is nutationally stable, the nutation angle will decay exponentially and the time constant can be monitored. If the system is unstable, the nutation angle will grow with time instead. If the system is unstable, it is preferred that the inversion maneuver be postponed until the system is stable.

A heuristic explanation of how a "fuel-less" orientation inversion of a dual spin satellite is physically possible is described first. In order for the spin axis to begin the inversion process, a transverse torque (i.e., perpendicular to the spacecraft spin axis) must be applied to the vehicle (i.e., the dual spin satellite). More particularly, the despin motor, normally used to control platform position, is commanded to apply a torque in a direction that will spin down the rotor and spin up the platform.

With specific reference now to FIGS. 1a–1d, it can be seen that a transverse torque of magnitude $I_{xz}\, dw_z/dt$ can be generated, through product of inertia coupling, by applying appropriate motor command signals (not shown) to the despin motor 18 to cause the despun platform 20 to accelerate and the rotor 16 to decelerate. More particularly, the acceleration of the despun platform 20 produces a force equal to $mr\, dw_z/dt$ which force is multiplied by the moment arm L to provide the transverse torque of magnitude $I_{xz}\, dw_z/dt$, where: $I_{xz}$ is the standard mathematical notation for the cross-product of the moments of inertia about the x- and z-axes; $w_z$ is the angular velocity of the platform 20 about the spacecraft spin or z-axis (as is depicted in FIG. 1a); r is the radius of the platform 20, and m is the mass of the platform 20 (as is depicted in FIG. 1a); and, L is the moment arm from the center of mass (C.M.) of the satellite 10 to the center of the platform 20 (as is depicted in FIG. 1a). This transverse torque is generated in order to purposely destabilize the satellite 10 and cause the spin axis 12 (which is the minimum moment of inertia axis) to diverge in a generally conical spiral towards the flat spin orientation shown in FIG. 1b, which is the natural or minimum energy state of the satellite 10. If active control of the despin motor 18 were ceased at this point, the satellite 10 would continue, in a passive flat spin mode, to rotate about its maximum (i.e., transverse) moment of inertia of axis (which, as was described hereinbefore, lies in the xy-plane defined in FIG. 1a), in accordance with the basic law of conversation of angular momentum. However, in accordance with the present invention, active control of the despin motor 18 is continued in order to continue the generation of the transverse torque, which will thus cause the satellite 10 to pass through the flat spin condition to a partially inverted position shown in FIG. 1c, and finally, to a completely inverted orientation shown in FIG. 1d (i.e., 180° relative to the initial position shown in FIG. 1a). However, it has been found that when the satellite 10 has been nearly inverted, e.g., when its spin axis orientation is disposed at an angle of 170° from its initial spin axis orientation, a "wall" or barrier will be encountered which prevents completion of the inversion, unless a "barrier breakdown" final acquisition control procedure is implemented. More particularly, the presently preferred final acquisition control procedure is implemented by means of applying a series of torquing pulses to the despin motor 18 in order to prevent the rotational motion of the platform 20 from being secular, i.e., uni-directional. For example, motor torques may be generated by means of applying motor torquing pulses to the despin motor 18. Of course, the specific magnitude of these torquing pulses and resultant motor torques will vary widely depending upon the mass properties and operating parameters of the particular spacecraft being inverted. Typically, a series of relatively large magnitude torquing pulses of an appropriate polarity for reducing the rotational speed of the platform 20, (e.g., to reduce the platform rotational speed by 5 r.p.m.), are transmitted to the despin motor 18, when the barrier condition is initially observed, followed by a similar series of relatively smaller magnitude torquing pulses for further trimming the thusly reduced rotational speed of the platform 20 (e.g. to further reduce the platform rotational speed by another 0.05 r.p.m.). It will be readily appreciated by those skilled in the pertinent art that this procedure institutes a limit cycle motion of the platform 20, thereby preventing the rotational motion of the platform 20 from being secular. Preferably, the timing and magnitude of the torquing pulses is such as to limit the average secular rate of the platform 20 to less than approximately 1 r.p.m. This condition is often referred to as a "platform capture" condition. Any control procedure which is effective to accomplish this goal may suitably be utilized in the practice of the present invention. In any event, this final acquisition procedure enables the passive nutation damping system 24 carried by the platform 20 to reduce the barrier nutation angle, which is hereby defined as the angle formed between the final/desired spin axis orientation and the spin axis orientation at the barrier condition. Otherwise stated, as long as the rotational motion of the platform 20 is prevented from being secular upon the satellite 10 reaching its barrier attitude, the passive nutation damping system 24 will gradually damp out the barrier nutation angle. Thus, it can be said that limit cycle motion of the platform 20 at the barrier attitude "breaks down" the barrier and enables the operation of the damping system 24 to pull the satellite 10 into its final, completely inverted orientation, which is depicted in FIG. 1d.

It should be readily appreciated that the above-described inversion maneuver technique of the instant invention may be physically implemented in any convenient manner. For example, the torquing pulses applied to the despin motor 18 may be manually issued by an operator(s) from a ground control station (not shown) over a command signal link (not shown) between the ground station and an on-board despin motor controller (not shown), which could conveniently be the controller associated with the motor active damping system 27, on a real-time basis, in response to real-time telemetry data transmitted from the satellite 10 to the earth ground station. Alternatively, the torquing pulses could be issued by an appropriately preprogrammed on-board microprocessor or computer, which could also conveniently be the controller associated with the motor active damping system. In the latter instance, the computer could suitably be preprogrammed to execute a predetermined sequence of steps in response to the detection of a threshold sun angle condition, in order to effectuate the inversion maneuver technique of the present invention.

Moreover, although the present invention has been described in detail herein it should be clearly understood that many variations and/or modifications of the basic inventive concepts herein taught which may appear to those skilled in the pertinent art will still fall within the spirit and scope of the present invention, which should be interpreted on the basis of the following claims. For example, although the invention has been disclosed in terms of inverting a spacecraft, it should be appreciated that the same inventive principles could instead be employed to change or adjust the attitude or orientation of the spacecraft by any desired amount less than a full or substantial inversion of the spacecraft. Otherwise stated, in its broadest sense, the present invention encompasses a method for re-orienting a dual spin spacecraft by increasing the speed of its platform and decreasing the speed of its rotor to thereby generate, via product of inertia coupling, a torque acting in a plane angularly displaced from the spin axis (which can be any moment of inertia axis other than the maximum moment of inertia axis), with the torque being of sufficient magnitude to temporarily destabilize the spacecraft and cause the spin axis to precess through a predetermined angle, thereby changing the attitude or orientation of the spacecraft. Of course, this re-orientation maneuver may be utilized for purposes other than to minimize thermal loading conditions.

What is claimed is:

1. A method for at least substantially inverting the orientation of a dual spin spacecraft, the spacecraft including a gyroscopic spinning rotor rotatably coupled via a despin motor and bearing assembly to a despun platform, the spin axis of the spacecraft being its minimum moment of inertia axis, the method including the steps of:

determining whether or not said spacecraft is nutationally stable, and practicing the remaining steps only if it is determined that said spacecraft is nutationally stable;

controlling said despin motor in such a manner as to accelerate rotation of said despun platform and decelerate rotation of said rotor, to thereby generate, via product of inertia coupling, a transverse torque perpendicular to said spin axis;

wherein said transverse torque is of sufficient magnitude to temporarily destabilize said spacecraft and cause said spin axis to diverge and precess towards a flat spin orientation, whereby said spacecraft spin axis becomes the maximum moment of inertia axis of said spacecraft; and, continuing to practice said controlling step, to thereby cause said spacecraft spin axis to precess through said flat spin orientation towards a final, inverted orientation.

2. The method as set forth in claim 1, wherein said spacecraft further includes nutation damping means, and wherein further, prior to said spacecraft spin axis reaching said final, inverted orientation, said spacecraft spin axis encounters a barrier nutation angle beyond which further precession of said spacecraft spin axis is not possible without any further steps being taken, the method further including the steps of:

detecting the occurrence of said spacecraft spin axis encountering said barrier nutation angle;

in response to said detecting step, further controlling said despin motor in such a manner as to institute a limit cycle rotational motion of said platform, thereby rendering non-secular the rotational motion of said platform, and, whereby said nutation damping means is enabled for penetrating said barrier nutation angle in order to achieve acquisition of said final, inverted orientation of said spacecraft spin axis.

3. The method as set forth in claim 2, wherein said nutation damping means comprises passive nutation damping means.

4. The method as set forth in claim 2, wherein said further controlling step comprises applying a first series of torquing pulses to said despin motor, said torquing pulses being of an appropriate polarity to reduce the rotational speed of said platform.

5. The method as set forth in claim 4, wherein said further controlling step further comprises applying a second series of torquing pulses to said despin motor, said second series of torquing pulses being of the same polarity as said first series of torquing pulses, but of a smaller magnitude than that of said first series of torquing pulses.

6. The method as set forth in claim 2, wherein said final, inverted orientation of said spacecraft spin axis is disposed at precession angle of approximately 180° relative to the orientation of said spacecraft spin axis prior to execution of said controlling step.

7. The method as set forth in claim 6, wherein said barrier nutation angle is approximately 10° as measured from said final, inverted orientation of said spacecraft spin axis.

8. The method as set forth in claim 1, wherein said initial step of determining includes the sub-steps of:

inducing nutation of said spacecraft about said spin axis thereof, said nutation being of a prescribed angle; and, determining whether said nutation angle decays with time, thereby indicating nutational stability of said spacecraft prior to execution of any of the remaining steps.

9. The method as set forth in claim 8, wherein said nutation inducing sub-step comprises applying a train of torque pulses to said despin motor in phase with the frequency of said nutation, to thereby produce a transverse torque perpendicular to said spacecraft spin axis.

10. The method as set forth in claim 1, wherein the spacecraft is disposed in an inclined orbit.

11. A method for at least substantially inverting the orientation of a dual spin spacecraft, the spacecraft including a gyroscopic spinning rotor rotatably coupled via a despin motor and bearing assembly to a despun platform, and further including nutation damping means, the spin axis of the spacecraft being its minimum moment of inertia axis, the method including the steps of:

controlling said despin motor in such a manner as to accelerate rotation of said despun platform and decelerate rotation of said rotor, to thereby generate, via product of inertia coupling, a transverse torque perpendicular to said spin axis;

wherein said transverse torque is of sufficient magnitude to temporarily destabilize said spacecraft and cause said spin axis to diverge and precess towards a flat spin orientation, whereby said spacecraft spin axis becomes the maximum moment of inertia axis of said spacecraft;

continuing to practice said controlling step, to thereby cause said spacecraft spin axis to precess through said flat spin orientation towards a final, inverted orientation;

wherein prior to said spacecraft spin axis reaching said final, inverted orientation, said spacecraft spin axis encounters a barrier nutation angle beyond which further precession of said spacecraft spin axis is not possible without any further steps being taken;

detecting the occurrence of said spacecraft spin axis encountering said barrier nutation angle;

in response to said detecting step, further controlling said despin motor in such a manner as to institute a limit cycle rotational motion of said platform, thereby rendering non-secular the rotational motion of said platform; and, whereby said nutation damping means is enabled for penetrating said barrier nutation angle in order to achieve acquisition of said final, inverted orientation of said spacecraft spin axis.

12. The method as set forth in claim 11, wherein said further controlling step comprises applying a first series of torquing pulses to said despin motor, said torquing pulses being of an appropriate polarity to reduce the rotational speed of said platform.

13. The method as set forth in claim 12, wherein said further controlling step further comprises applying a second series of torquing pulses to said despin motor, said second series of torquing pulses being of the same polarity as said first series of torquing pulses, but of a smaller magnitude than that of said first series of torquing pulses.

* * * * *